United States Patent
Al-Kanani et al.

(10) Patent No.: US 12,160,755 B2
(45) Date of Patent: Dec. 3, 2024

(54) NETWORK DATA ANALYTICS FOR OAM

(71) Applicant: NEC Corporation, Tokyo (JP)

(72) Inventors: Hassan Al-Kanani, Langley (GB); Linghang Fan, Woking (GB); Iskren Ianev, Reading (GB); Sivasubramaniam Ramanan, Harrow (GB)

(73) Assignee: NEC CORPORATION, Tokyo (JP)

( * ) Notice: Subject to any disclaimer, the term of this patent is extended or adjusted under 35 U.S.C. 154(b) by 229 days.

(21) Appl. No.: 16/969,993

(22) PCT Filed: Feb. 15, 2019

(86) PCT No.: PCT/EP2019/053902
§ 371 (c)(1),
(2) Date: Aug. 14, 2020

(87) PCT Pub. No.: WO2019/158737
PCT Pub. Date: Aug. 22, 2019

(65) Prior Publication Data
US 2021/0105638 A1    Apr. 8, 2021

(30) Foreign Application Priority Data
Feb. 16, 2018    (EP) .................................... 18157266

(51) Int. Cl.
*H04W 24/02*    (2009.01)
*H04L 43/0817*    (2022.01)
*H04W 24/08*    (2009.01)

(52) U.S. Cl.
CPC ......... *H04W 24/02* (2013.01); *H04L 43/0817* (2013.01); *H04W 24/08* (2013.01)

(58) Field of Classification Search
CPC .... H04W 24/02; H04W 24/08; H04L 43/0817
USPC ........................................................ 709/223
See application file for complete search history.

(56) References Cited

U.S. PATENT DOCUMENTS

2015/0382209 A1* 12/2015 Sanneck ............... H04W 24/02
                                                   370/254
2018/0159747 A1*  6/2018 Chang ................. H04L 41/5045
2019/0174466 A1*  6/2019 Zhang .................. H04L 5/0057

FOREIGN PATENT DOCUMENTS

WO    WO 2018/128804    *  7/2018

OTHER PUBLICATIONS

"3rd Generation Partnership Project; Technical Specification Group Services and System Aspects; Policy and Charging Control Framework for the 5G System; Stage 2 (Release 15)", 3GPP Draft; 23503-F00, Mobile Competence Centre ; 650, Route Des Lucioles; F-06921 Sophia-Antipolis Cedex; France, Jan. 29, 2018, XP051384055.

* cited by examiner

*Primary Examiner* — Hermon Asres
(74) *Attorney, Agent, or Firm* — Sughrue Mion, PLLC

(57) ABSTRACT

A method performed by an operations administration and management (OAM) apparatus includes acting as a Management Data Analytics Function (MDAF) in a network. The network includes a plurality of network functions (NFs). Acting as the MDAF includes: collecting management data and network data from the network, analysing the management data and the network data, and providing a receiving entity with management data analytics service information based on the analysis of the management data and the network data.

6 Claims, 8 Drawing Sheets

NSMF: Network Slice Management Function
NSSMF: Network Slice Subnet Management Function

NETWORK DATA ANALYTICS FOR OAM

CROSS-REFERENCE TO PRIOR APPLICATIONS

This application is a U.S. National Phase Application under 35 U.S.C. § 371 of International Application No. PCT/EP2019/053902, filed on Feb. 15, 2019, and claims benefit to German Patent Application No. EP 18157266.0, filed on Feb. 16, 2018. The International Application was published in English on Aug. 22, 2019 as WO 2019/158737 under PCT Article 21(2).

FIELD

The present invention relates to a communication system. The invention has particular but not exclusive relevance to wireless communication systems and devices thereof operating according to the 3rd Generation Partnership Project (3GPP) standards or equivalents or derivatives thereof. The invention has particular although not exclusive relevance to network data analytics in the so-called '5G' (or 'Next Generation') systems.

BACKGROUND

The 3GPP Working Groups (WGs) are currently defining the 5G system, and the 3GPP TSG SA WG2 is specifying the system architecture and procedures for 5G system while the 3GPP TSG SA WG5 is specifying the telecom management.

The huge advancements and complexity of communication systems along with the diversity of services and rising expectations from 5G system, all raise the need for a revolutionary transformation to the way networks and services are managed and operated. To facilitate delivery of the diversity of services to meet requirements of different categories of customers, network slicing is also expected to be a primary and an integrated feature of the future generation networks. The introduction of network slicing is also expected to add further impacts and complexities on management systems. To overcome all aforementioned challenges and in order to aim for an agile, fully automated, and zero touch network management and operation, means that certain level of intelligence will have to be introduced into the management systems.

For example one of the biggest challenges with today's network management solutions, is to proactively identify overload and faults issues before it impacts end-users. An access to some kind of distributed or centralized collection of network data analytics such as load level status and network-resource utilization information (real time and/or historical data analytics), both at the network functions and services level (e.g. at a network slice level) will significantly enhance the function and agility of the management and operation system.

Currently, a new network function Network Data Analytics Function (NWDAF), representing operator managed network analytics logical function, is being specified by SA2 and CT working groups.

According to 3GPP Technical Specification (TS) 23.501 V15.0.0, TS 23.502 V15.0.0, and TS 23.503 V15.0.0, the so-called NWDAF (Network Data Analytics Function) provides slice-specific network data analytics (i.e., load level information) to PCF (Policy Control Function) and NSSF (Network Slice Selection Function) on a network slice level. The NWDAF notifies/publishes slice specific network status analytic information to the PCF(s) and NSSF that are subscribed to it. PCF(s) and NSSF can directly collect slice specific network status analytic information from the NWDAF.

In SA5, 3GPP Technical Report (TR) 28.800 V15.0.0, TR 28.801 V15.1.0, and TR 28.802 V15.0.0 define a number of logical functions to manage NW slices, both at slice and slice's constituent subnet/functions level. A number of management functions are being specified by SA5 for supporting the management of the next generation networks and services. There are two types of management functions in these categories: 1) Network slice related management functions (e.g. Communication service management function (CSMF), Network slice management functions (NSMF) and Network slice subnet management functions (NSSMF)); and 2) 5G Network function related management functions.

TR 28.800, Section 5.3.2 also describes a logical management entity with a role to collect PM and FM data. The contents of the above 3GPP documents are incorporated herein by reference.

SA5 has also started recently to define a service based network and service management architecture.

SUMMARY

An embodiment of the present invention provides a method performed by an operations administration and management (OAM) apparatus that includes acting as a Management Data Analytics Function (MDAF) in a network. The network includes a plurality of network functions (NFs). Acting as the MDAF includes: collecting management data and network data from the network, analysing the management data and the network data, and providing a receiving entity with management data analytics service information based on the analysis of the management data and the network data.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
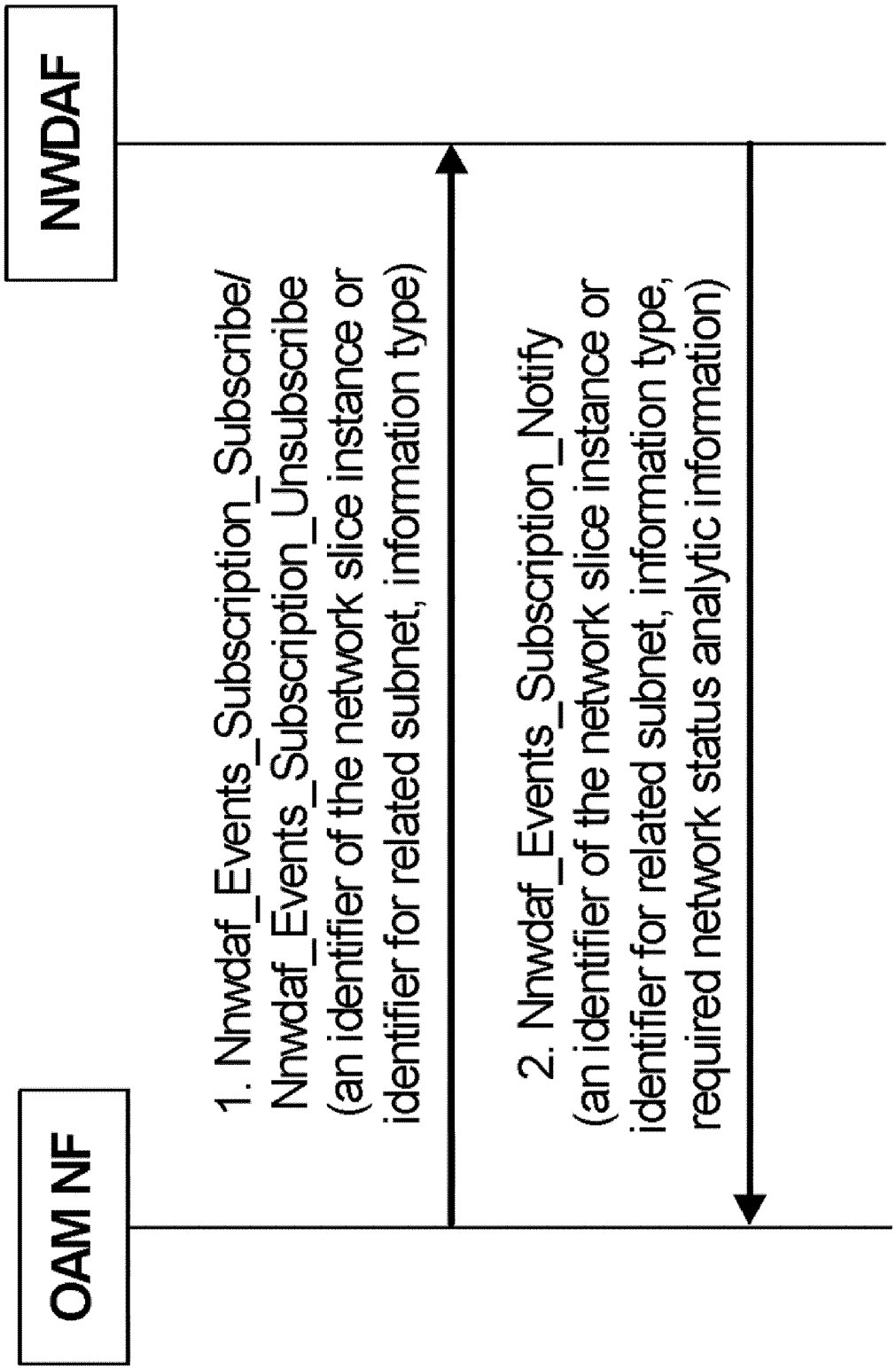
FIG. 1 illustrates schematically an exemplary procedure for service based interaction between NWDAF and OAM NF(s), in case of the service subscription option.

Network data analytics could provide a crucial tool for the 5G OAM system. For example, the management functions (e.g. 5G network function related, and network slice related management functions) need load level information on existing network slice(s) before creating a new slice, modifying, or terminating an existing network slice. The management functions need load level information on network slice(s) for provisioning, maintenance and performance monitoring.

An access to data analytics, such as those collected and maintained by the NWDAF and/or by a newly defined entity (as part of the management system) could significantly enhance the OAM system functionality and facilitate automation/zero touch operations.

In one aspect, an embodiment of the invention provides a method performed by an operations administration and management (OAM) apparatus. The method includes: acting as a Management Data Analytics Function (MDAF) in a network comprising a plurality of network functions (NFs). Acting as the MDAF comprises: the MDAF collecting management data and network data from the network, the MDAF analysing the management data and the network data, and the MDAF providing a receiving entity with management data analytics service information based on the analysis.

The management data analytics service information may comprise fault and/or alarm, performance, configuration, capacity or resource usage.

The MDAF may be a producer of the management data analytics service and the receiving entity may be a consumer of management data analytics service.

The management data analytics service information may be provided to at least one of: a self-organising network (SON) function; a network management system (NMS); a network slice management function (NSMF); network slice subnet management function (NSSMF); network performance and service assurance management and orchestration entities; an operation support system (OSS); and/or or s business support system (BSS).

In one aspect, an embodiment of the invention provides an operations administration and management (OAM) apparatus for a network comprising a plurality of network functions (NFs), the OAM comprising: a Management Data Analytics Function (MDAF). The MDAF is configured to: collect management data and network data from the network, analyse the management data and the network data, and provide a receiving entity with management data analytics service information based on the analysis.

The MDAF may be configured as a separate entity or as part of other functions including network management system (NMS), network slice management function (NSMF) or network slice subnet management function (NSSMF). The MDAF may be configured as a distributed or centralised entity.

In one aspect, an embodiment of the invention provides a method for operations administration and management (OAM) apparatus configured to communicate with a network data analytics function (NWDAF). The method includes: acting as a Management Data Analytics Function (MDAF), wherein acting as the MDAF comprises: the MDAF receiving, from the NWDAF, a subscription message or request message; the MDAF performing processing associated with the subscription message or the request message; and the MDAF sending, from the OAM to NWDAF, management data analytics information based on the processing via a notification message or a response message; wherein the MDAF is a management service producer and the NWDAF is a management service consumer.

The processing may comprise data collection and data analytics. The management data analytics information may comprise load information. The second management data analytics information may be sent at a predetermined period after sending the management data analytics information.

In one aspect, an embodiment of the invention provides an operations administration and management (OAM) apparatus configured to communicate with a network data analytics function (NWDAF). The OAM apparatus includes: a Management Data Analytics Function (MDAF), wherein the MDAF is configured to: receive, from the NWDAF, a subscription message or request message; perform processing associated with the subscription message or the request message; and send, from the OAM to NWDAF, management data analytics information based on the processing via a notification message or a response message; wherein the MDAF is a management service producer and the NWDAF is a management service consumer.

In one aspect, an embodiment of the invention provides a method for a network in which operations administration and management (OAM) apparatus communicates with NWDAF responsible for providing network data analytics for network. The method includes: the OAM acting as a Management Data Analytics Function (MDAF); the NWDAF receiving, from the OAM apparatus, a subscription message or a request message; the NWDAF performing processing associated with the subscription message or the request message; the NWDAF sending to the OAM apparatus, network status data analytic information via processing of a response message or via processing of a notification message, either periodic or upon exceeding threshold; and the NWDAF sending to the OAM apparatus, network status data analytic information via an element management system (EMS) based on processing via a REpresentational State Transfer (REST)-Ful HTTP solution set; wherein the OAM apparatus is a service consumer and the NDWAF is a service producer of network data analytics.

The network data analytics information may be sent to the OAM apparatus, indicating an information type. The network status data analytic information may comprise load information. The load level information may be for a network slice instance identified by a network slice instance identifier. The load level information may be for a network slice subnet or a subnet identified by a network slice subnet identifier or a subnet identifier.

In one aspect, an embodiment of the invention provides a network comprising an operations administration and management (OAM) apparatus which communicates with NWDAF responsible for providing network data analytics for network. The OAM comprises a Management Data Analytics Function (MDAF); the NWDAF is configured to receive, from the OAM apparatus, a subscription message or a request message; the NWDAF is configured to perform processing associated with the subscription message or the request message, the NWDAF is configured send, to the OAM apparatus, network status data analytic information via processing of a response message or via processing of a notification message, either periodic or upon exceeding threshold, and the NWDAF is configured to send, to the OAM apparatus, network status data analytic information via an element management system (EMS) based on processing via a REpresentational State Transfer (REST)-Ful HTTP solution set, wherein the OAM apparatus is a service consumer and the NDWAF is a service producer of network data analytics.

The OAM apparatus may comprise at least one of: a network Slice management function (NSMF); a network slice subnet management function (NSSMF); a network management system (NMS); and/or an element management system (EMS).

Embodiments of the invention will now be described, by way of example only, with reference to the attached drawings.

In order to address the problem of lack of network data analytics function for OAM, a number of possible solutions are described in the following exemplary embodiments. These embodiments are targeting different OAM architecture approaches/options.

Embodiment 1: OAM Network Functions (NF(s)) as a New Service Consumer(s) of NWDAF Based on Service-Based Architecture An idea of this embodiment is as follows: because the NWDAF is responsible for providing network data analytics for the network, OAM NF(s) (e.g. NMS (Network Management System) and/or Network Slices Management Functions) are proposed to be a new service consumer(s) of the NWDAF service. Two new procedures are provided: a service subscription and on demand service type. These are described below:

1. service subscription: OAM NFs subscribe to the NWDAF service to receive data analytic information (e.g. load level information) periodically or at a threshold exceeding value. The NWDAF notifies/publishes network status data analytic information (e.g. load level information) to the OAM NF(s) that are subscribed to it.
2. on demand: OAM NFs can collect directly network status data analytic information (e.g. load level information) from the NWDAF whenever required.

1.1 Procedure for Service Based Interaction Between the NWDAF and OAM NF(s)—Service Subscription FIG. 1 illustrates schematically an exemplary procedure for service based interaction between NWDAF and OAM NF(s), in case of the service subscription option.

This procedure is used by OAM NF(s) to subscribe/unsubscribe to the NWDAF service to be notified on network status data analytic information (e.g. load level information) of a network slice instance or identifier for related subnet. Periodic notification and notification upon exceeding a threshold can be subscribed.

As shown in FIG. 1, there are two steps in this procedure:
1. OAM NF subscribes or unsubscribes to cancel an existing subscription to a network status data analytic information by invoking the Nnwdaf_Events_Subscription_Subscribe/Nnwdaf_Events_Subscription_Unsubscribe service or any other suitable service or message for the purpose of subscription for OAM NF related data analytics which includes an identifier of the network slice instance (e.g. NSI ID), or identifier for related subnet and information type.
2. If OAM NF subscribe to network status data analytic information, the NWDAF provides the OAM NF with network status data analytic information by invoking Nnwdaf_Events_Subscription_Notify service or any other suitable service or message for the purpose of providing network status data analytics information to the OAM NF. The network status data analytic information may be provided with at least one of the identifier of the network slice instance, the identifier for related subnet, and the information type.

1.2 Procedure for Service Based Interaction Between NWDAF and OAM NF—On Demand

Figure 2:
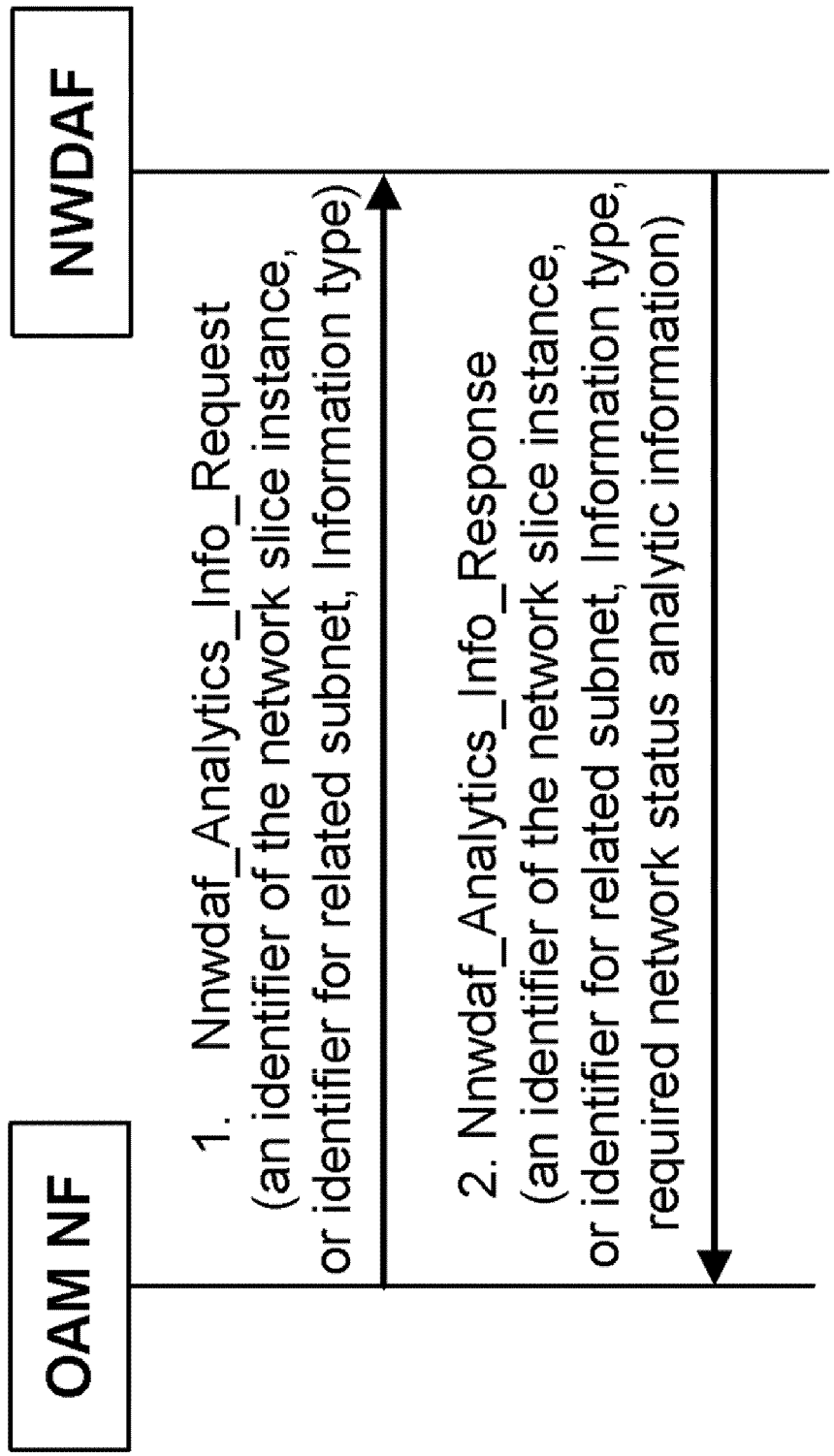
FIG. 2 illustrates schematically an exemplary procedure for service based interaction between NWDAF and OAM NF, in case of the on demand option.

FIG. 2 illustrates schematically an exemplary procedure for service based interaction between NWDAF and OAM NF, in case of the on demand option.

In this procedure, OAM NF should be able to request and get from the NWDAF the required network status data analytic information (e.g. load level information) as and whenever required based on the on-demand service.

As shown in FIG. 2, there are two steps in this procedure.
1. OAM NF requests network status data analytic information for a network slice instance or identifier for related subnet by invoking Nnwdaf_Analytics_Info_Request service or any other suitable service or message for the purpose of requesting network status data analytics information which includes an identifier of the network slice instance (e.g. NSI ID), or identifier for related subnet, and information type.
2. The NWDAF responds with network status data analytic information for a network slice instance and/or identifier for related subnet or NF by invoking Nnwdaf_Analytics_Info_Response service or any other suitable service or message for the purpose of providing network status data analytics information related to network slice instance or network slice subnet. The network status data analytic information may be provided with at least one of the identifier of the network slice instance, the identifier for related subnet, and the information type.

Embodiment 2: NWDAF Provides OAM NF(s) Network Data Analytics Information Based on Interface-Based Architecture FIG. 3 illustrates schematically an exemplary interface-based option for NWDAF and OAM NFs.

The OAM function, e.g. NMS (Network Management system) manages the 3GPP Network Functions (NFs) and/or Network Elements (NEs) (including NFs and NEs of both Core and Access networks) via an EMS (Element Management System) or directly (where EMS function is integrated within the NE itself), through itf-N management interface. For itf-N, the 3GPP SA5 have specified a number of Integration Reference Points (IRPs) defining the information in the agent (i.e. NE/EMS) that is visible for the manager (i.e. NMS), the operations that the manager may perform on this information and the notifications that are sent from the agent to the manager.

Figure 3:
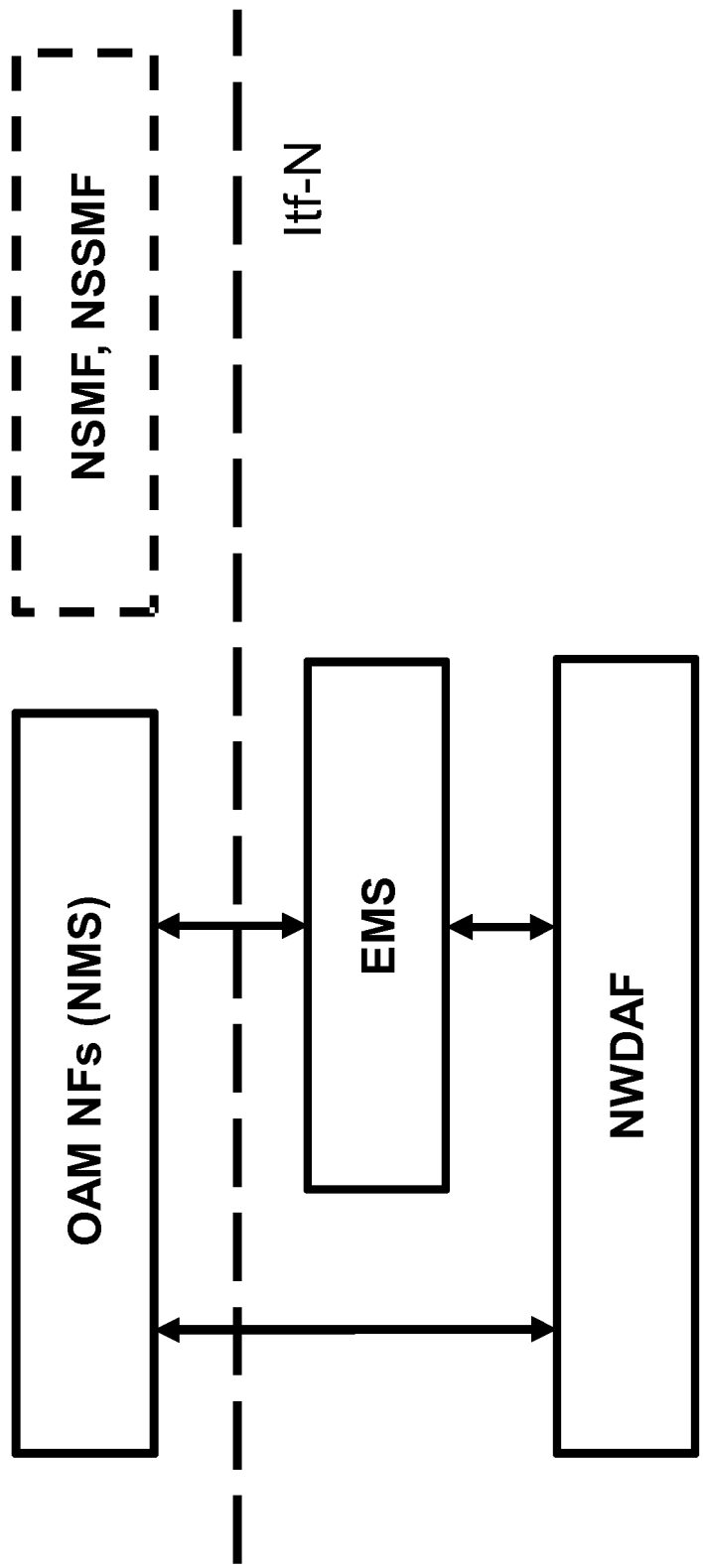
FIG. 3 illustrates schematically an exemplary interface-based option for NWDAF and OAM NFs.

In this embodiment, as shown in FIG. 3, OAM NF(s) (e.g. NMS, NSMF and/or NSSMF) are proposed to obtain (consume) network status data analytic information (e.g. load level information) from the NWDAF via EMS (e.g., Itf-N) or via other dedicated interface.

Solution sets such as those based on REST (REpresentational State Transfer)-ful HTTP can be adopted to facilitate collection of information from the NWDAF to the OAM functional entity/entities.

Embodiment 3: New NWDAF-Like Functionality as a Part of the OAM System

Figure 4:
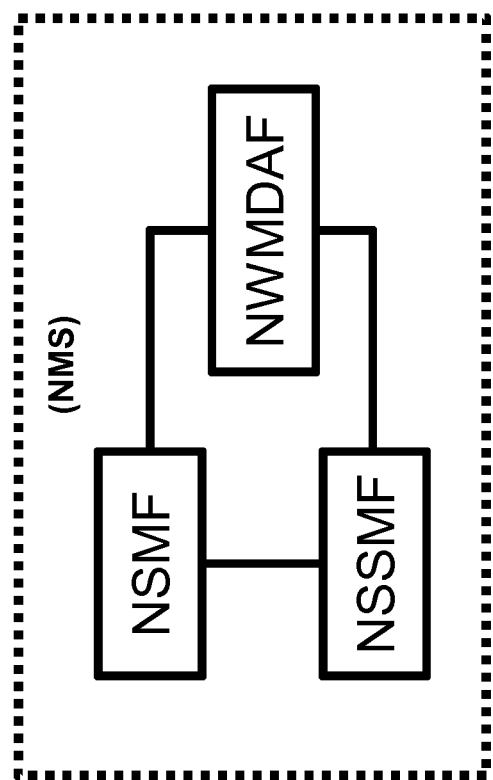
FIG. 4 illustrates schematically an NWMDAF as a sub-function of the OAM function.

FIG. 4 illustrates schematically an NWMDAF as a sub-function of the OAM function (e.g. Network Management System (NMS)).

In this embodiment, a new functionality (NWMDAF: Network Management Data Analytics Function) is provided to be part of the management reference model/architecture to support the OAM system for networks, network slice and service management and orchestration.

NWMDAF as a distributed or centralised entity can have various management-specific functionalities, in addition to slice-specific network data analytics functions, it can also be for example used to assist management functions for fault/alarm, configuration, network performance and service assurance management, SON-like and automation data collection and analysis.

NWMDAF can be integrated as part of a service based and/or interface (reference point) based management architecture.

The NWMDAF is a logical function that can be introduced at the network management layer, i.e., be for example either part of the NMS functionality and/or the slice management functions (e.g. NSMF, NSSMF).

As shown in FIG. 4, an integration example where the new function NWMDAF is introduced as a sub-function of the Network Management System (NMS) to aid and support management of network slicing and potentially other aspect of the OAM functionalities including for example SON/automation related functionalities.

The NWMDAF is a logical function representing a group of sub functions or micro services, each of which can have a dedicated role as follows:
 Data collection and repository of management information, and
 Analytic and reporting entities or micro services—each dedicated to a certain role (e.g. alarm, performance, configuration, capacity/resource usage management, etc.).

The NWMDAF can make the data analytics available for the management entities at the network management layer as well as for a higher-level correlation at the business and operations activities, including business support systems (BSS) and operational support systems (OSS).

The newly introduced management entity, NWMDAF can also be a service consumer of NWDAF or vice versa.

Beneficially, the above described exemplary embodiments include, although they are not limited to, one or more of the following functionalities:
 1) Based on service-based architecture, OAM NF(s) are provided as a new service consumer of the NWDAF.
 2) Both, a network subscription and on demand service procedures have been provided.
 3) Based on interface-based architecture, NWDAF provides OAM NF(s) with network data analytics information.
 4) New NWDAF-like functionality, referred to as NWMDAF is proposed as a part of the OAM system.
It can be seen that, in the above embodiments:
 1) A network function provides network data analytics to OAM based on service-based architecture,
 2) A network function provides network data analytics to OAM via Itf-N or a dedicated interface,
 3) A network function, who is a part of NMS, provides network data analytics.

It can be seen that the above embodiments beneficially provide a number of benefits, including (but not limited to) providing network data analytics to OAM to optimise the network performance.

Figure 5:
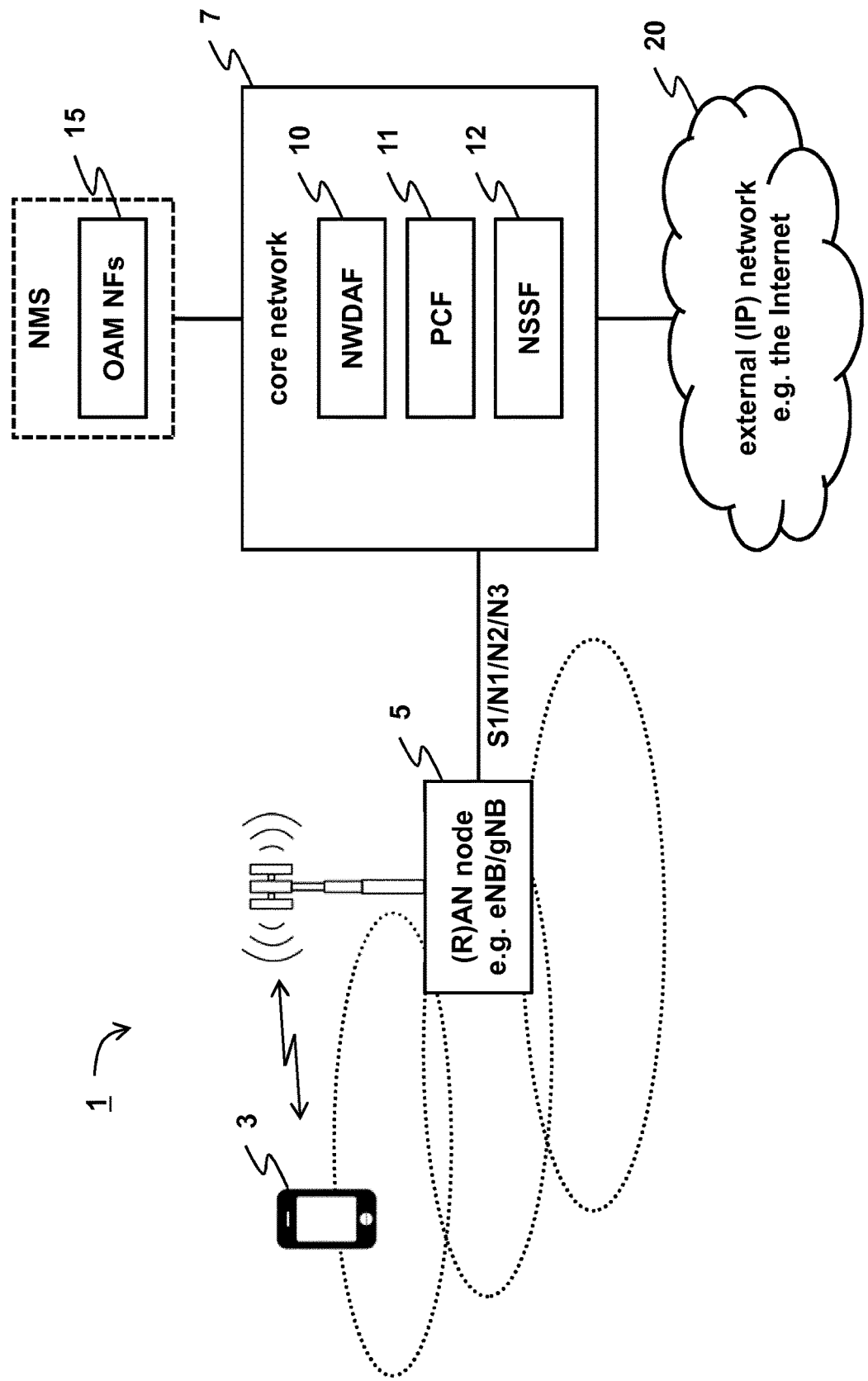
FIG. 5 schematically illustrates a mobile (cellular or wireless) telecommunication system to which the described embodiments are applicable.

FIG. 5 schematically illustrates a mobile (cellular or wireless) telecommunication system 1 to which the above embodiments are applicable.

In this network, users of mobile devices 3 (Us) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst one mobile device 3 and one base station 5 are shown in FIG. 5 for illustration purposes, the system, when implemented, will typically include other base stations and mobile devices (UEs).

Each base station 5 controls one or more associated cells (either directly or via other nodes such as home base stations, relays, remote radio heads, and/or the like). A base station 5 that supports E-UTRA/4G protocols may be referred to as an 'eNB' and a base station 5 that supports NextGeneration/5G protocols may be referred to as a 'gNBs'. It will be appreciated that some base stations 5 may be configured to support both 4G and 5G, and/or any other 3GPP or non-3GPP communication protocols.

The mobile device 3 and its serving base station 5 are connected via an appropriate air interface (for example the so-called 'Uu' interface and/or the like). Neighbouring base stations 5 are connected to each other via an appropriate base station to base station interface (such as the so-called 'X2' interface, 'Xn' interface and/or the like). The base station 5 is also connected to the core network nodes via an appropriate interface (such as the so-called 'S1', 'N1', 'N2', 'N3' interface, and/or the like).

The core network 7 typically includes logical nodes (or 'functions') for supporting communication in the telecommunication system 1. Typically, for example, the core network 7 of a 'Next Generation'/5G system will include, amongst other functions, control plane functions and user plane functions. In this example, the core network 7 includes, amongst others, a Network Data Analytics Function (NWDAF) 10, a Policy Control Function (PCF) 11, and a Network Slice Selection Function (NSSF) 12.

The core network 7 is coupled to one or more OAM network function (NF) 15 which may be provided in a so-called Network Management System (NMS). Although shown separately in FIG. 5, it will be appreciated that the NMS/OAM NF 15 may form part of the core network 7. An OAM NF 15 may be configured as any one (or more) of the following network functions: a Network Slice Management Function (NSMF), a Network Slice Subnet Management Function (NSSMF), a Network Management Data Analytic Function (NWMDAF), and/or the like.

From the core network 7, connection to an external IP network 20 (such as the Internet) is also provided.

User Equipment (UE)

Figure 6:
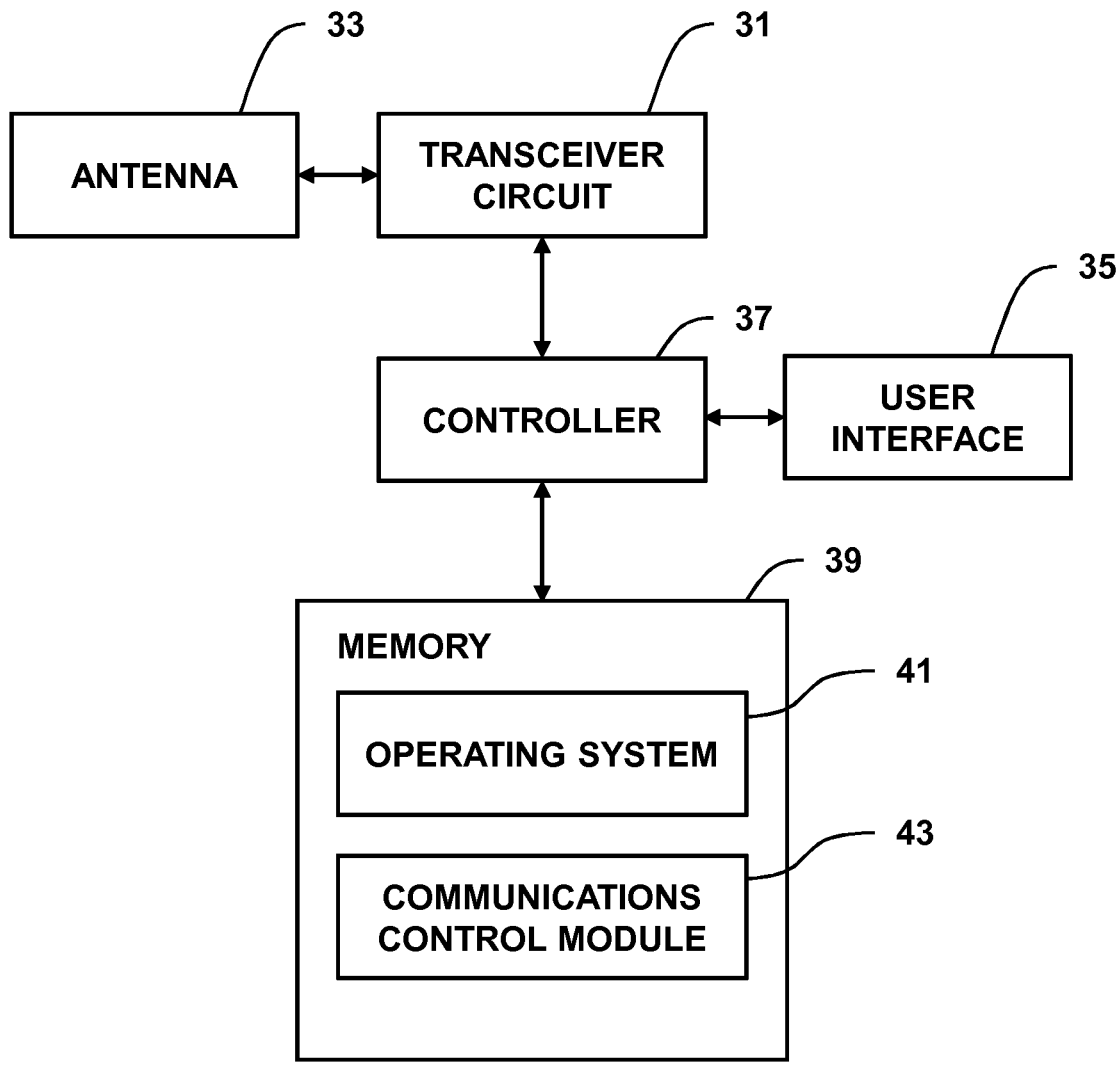
FIG. 6 is a block diagram illustrating components of the UE shown in FIG. 5.

FIG. 6 is a block diagram illustrating components of the UE (mobile device 3) shown in FIG. 5. As shown, the UE includes a transceiver circuit 31, which is operable to transmit signals to and to receive signals from the connected node(s) via one or more antenna 33. Although not necessarily shown in FIG. 6, the UE will of course have all the usual functionality of a conventional mobile device (such as a user interface 35) and this may be provided by any one or any combination of hardware, software and firmware, as appropriate. A controller 37 controls the operation of the UE in accordance with software stored in a memory 39. The software may be pre-installed in the memory 39 and/or may be downloaded via the telecommunication network 1 or from a removable data storage device (RMD), for example. The software includes, among other things, an operating system 41 and a communications control module 43. The communications control module 43 is responsible for handling (generating/sending/receiving) signalling messages and uplink/downlink data packets between the UE 3 and other nodes, including (R)AN nodes 5 and core network nodes.

(R)AN Node

Figure 7:
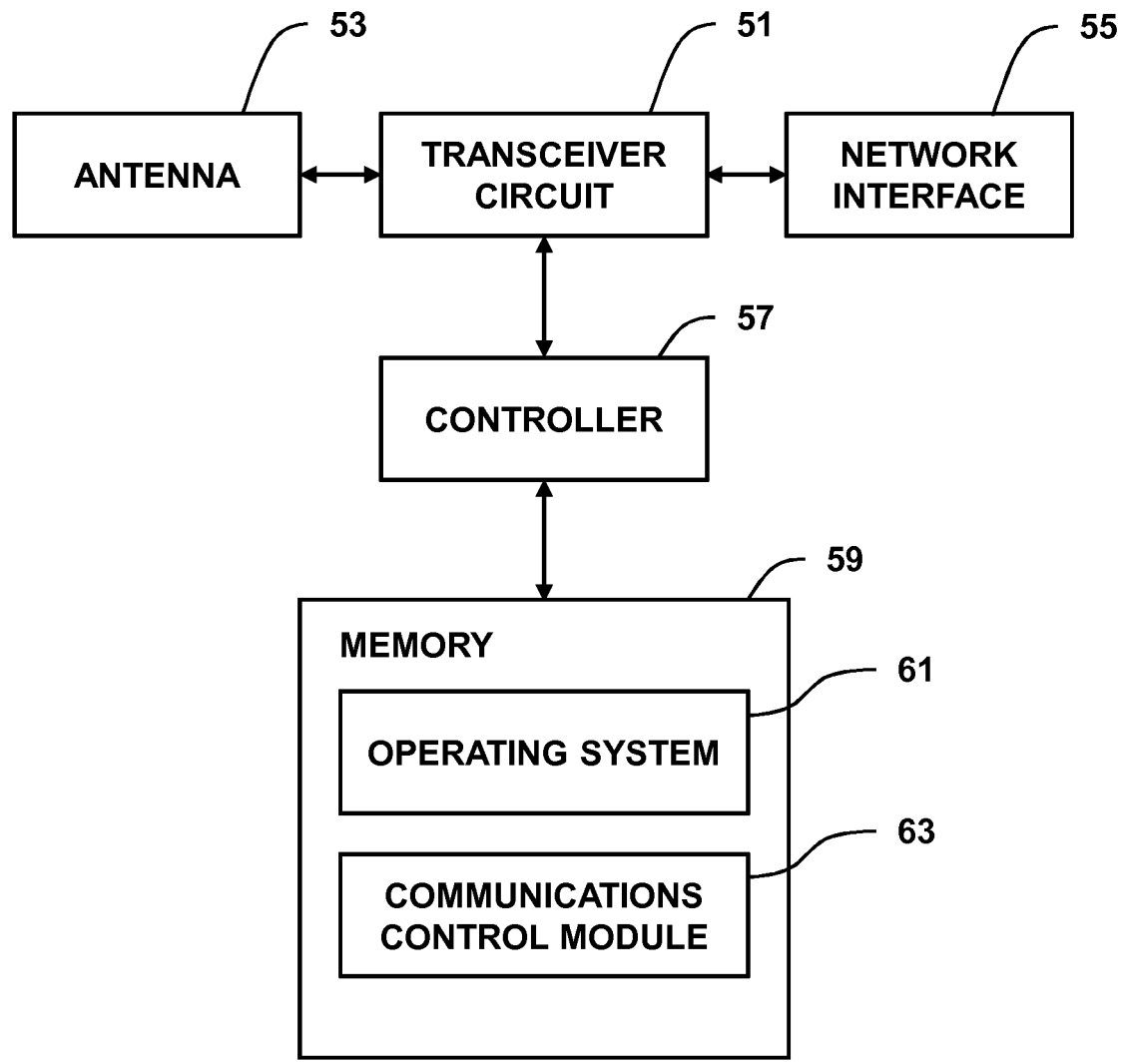
FIG. 7 is a block diagram illustrating components of an exemplary (R)AN node shown in FIG. 5.

FIG. 7 is a block diagram illustrating components of an exemplary (R)AN node 5 (base station) shown in FIG. 5. As shown, the (R)AN node 5 includes a transceiver circuit 51 which is operable to transmit signals to and to receive signals from connected UE(s) 3 via one or more antenna 53 and to transmit signals to and to receive signals from other network nodes (either directly or indirectly) via a network interface 55. The network interface 55 typically includes an appropriate base station—base station interface (such as X2/Xn) and an appropriate base station—core network interface (such as S1/N1/N2/N3). A controller 57 controls the operation of the (R)AN node 5 in accordance with software stored in a memory 59. The software may be pre-installed in the memory 59 and/or may be downloaded via the telecommunication network 1 or from a removable data storage device (RMD), for example. The software includes, among other things, an operating system 61 and a communications control module 63. The communications control module 63 is responsible for handling (generating/sending/receiving) signalling between the (R)AN node 5 and other nodes, such as the UE 3 and the core network nodes. The communications control module 63 is also responsible for communicating data packets for each UE using a network slice that is appropriate for that UE.

Network Node

Figure 8:
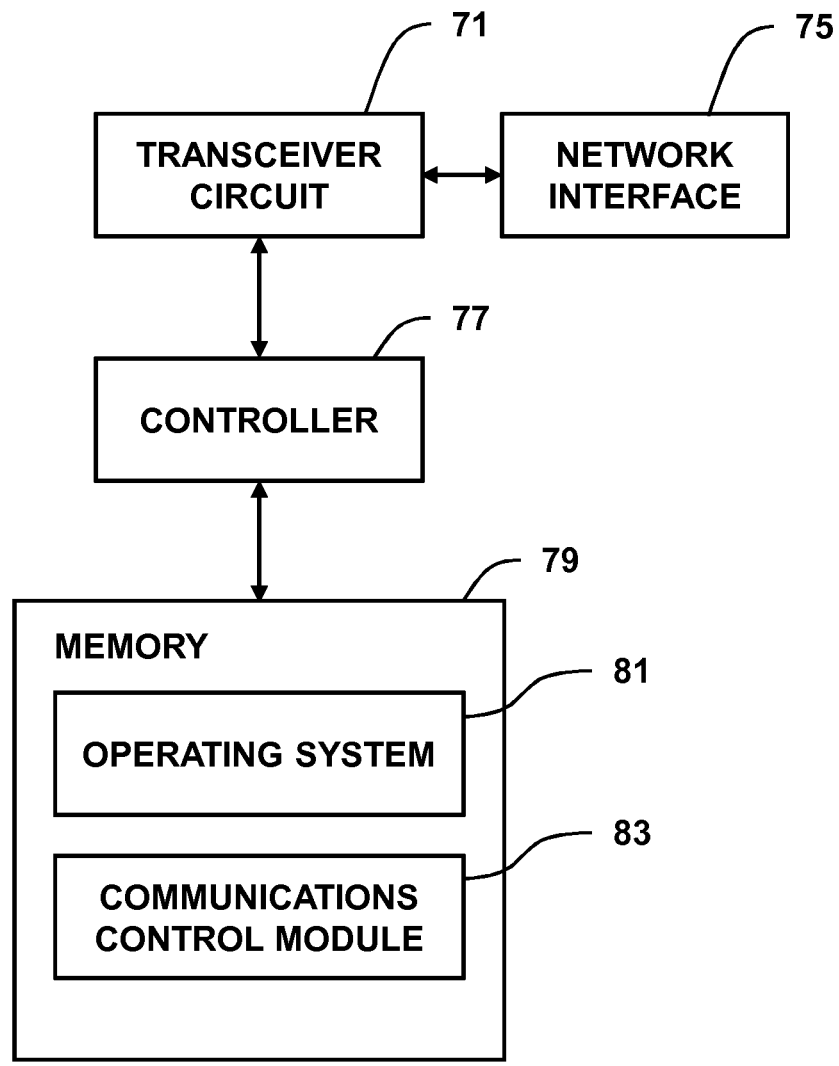
FIG. 8 is a block diagram illustrating components of a network node.

FIG. 8 is a block diagram illustrating components of a network node, for example, a core network node (e.g. NWDAF 10, PCF 11, NSSF 12) or a network node configured as an OAM NF 15 (e.g. NSMF, NSSMF, NWMDAF). As shown, the network node includes a transceiver circuit 71, which is operable to transmit signals to and to receive signals from other nodes (including the UE 3 and the (R)AN node 5) via a network interface 75. A controller 77 controls the operation of the network node in accordance with software stored in a memory 79. The software may be pre-installed in the memory 79 and/or may be downloaded via the telecommunication network 1 or from a removable data storage device (RMD), for example. The software includes, among other things, an operating system 81 and a communications control module 83. The communications control module 83 is responsible for handling (generating/sending/receiving) signaling between the network node and other nodes, such as the UE 3, (R)AN node 5, and other network nodes.

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

In the above description, the UE, the (R)AN node, and the network node are described for ease of understanding as having a number of discrete modules (such as the communication control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

In the above embodiments, a number of software modules were described. As those skilled in the art will appreciate, the software modules may be provided in compiled or un-compiled form and may be supplied to the UE, the (R)AN node, and the network node as a signal over a computer network, or on a recording medium. Further, the functionality performed by part or all of this software may be performed using one or more dedicated hardware circuits. However, the use of software modules is preferred as it facilitates the updating of the UE, the (R)AN node, and the network node in order to update their functionalities.

The above embodiments are also applicable to 'non-mobile' or generally stationary user equipment.

Various other modifications will be apparent to those skilled in the art and will not be described in further detail here.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method performed by a Management Data Analytics Function (MDAF) node in an operations administration and management (OAM) network, the method comprising:
   collecting network management data to be analyzed by the MDAF node, from a first network node connected via a service-based architecture in a 3rd Generation Partnership Project (3GPP) network;
   analyzing the network management data; and
   providing a second network node connected via the service-based architecture in the 3GPP network, with management data analytics service information based on the analyzing the network management data, wherein at least one of the first network node and the second network node is a Network Data Analytics Function (NWDAF) node for analyzing network data in the 3GPP network.

2. A Management Data Analytics Function (MDAF) node in an operations administration and management (OAM) network, the MDAF node comprising:
a memory storing instructions; and
at least one processor configured to process the instructions to:
collect network management data to be analyzed by the MDAF node, from a first network node connected via a service-based architecture in a 3rd Generation Partnership Project (3GPP) network,
analyze the network management data, and
provide a second network node connected via the service-based architecture in a 3GPP network, with management data analytics service information based on the analysis of the network management data,
wherein at least one of the first network node and the second network node is a Network Data Analytics Function (NWDAF) node for analyzing network data in the 3GPP network.

3. The method according to claim 1, wherein the management data analytics service information is provided to a self-organizing network (SON) function, a network management system (NMS), a network slice management function (NSMF), a network slice subnet management function (NSSMF), network performance and service assurance management and orchestration entities, an operation support system (OSS), and a business support system (BSS).

4. The method according to claim 1, wherein the network management data includes network slice-specific information.

5. The method according to claim 1, wherein the at least one of the first network node or the second network node includes the NWDAF.

6. The method according to claim 1, further comprising:
interacting with the NWDAF node leveraging the management data analytics service information for controlling another network node in the 3GPP network.

* * * * *